Jan. 29, 1957     G. A. LYON     2,779,633
WHEEL COVER
Filed Sept. 3, 1954
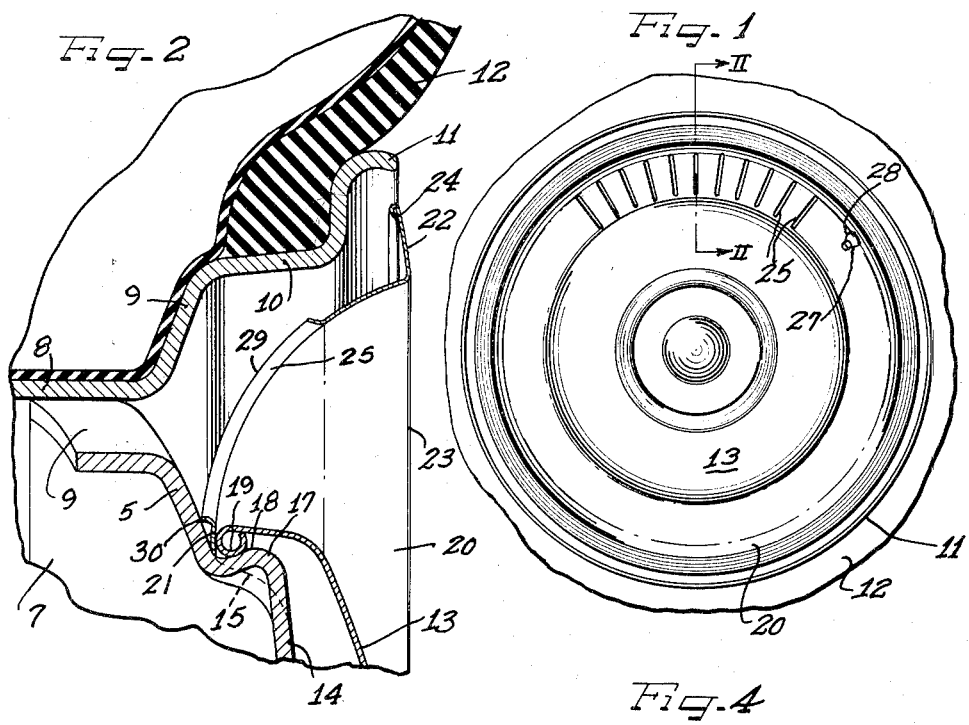
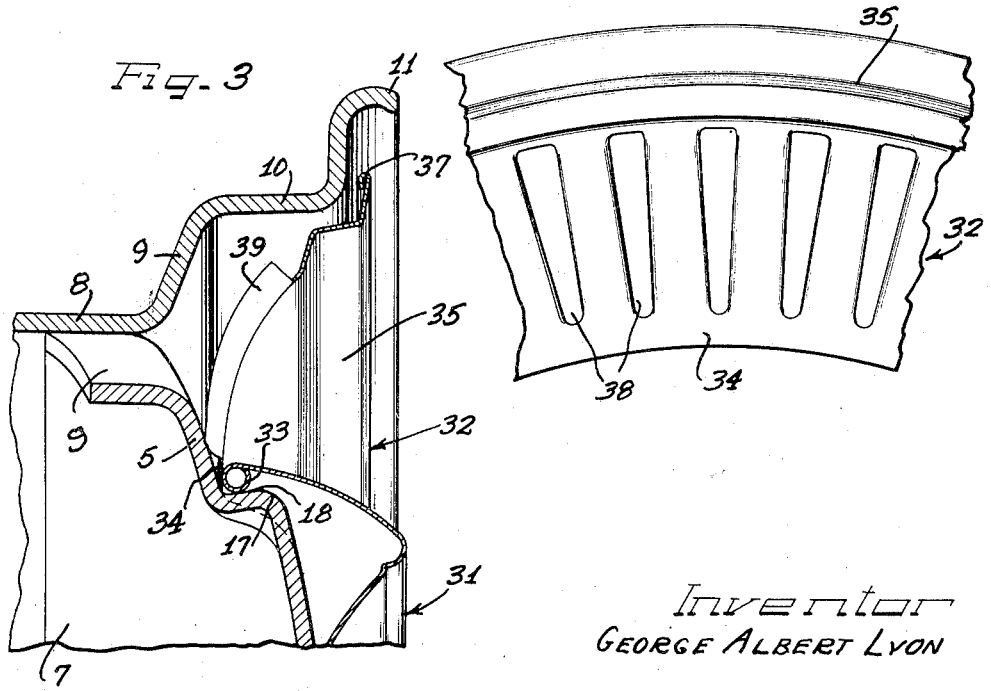
Inventor
GEORGE ALBERT LYON
By Hill, Sherman, Meroni, Gross & Simpson Attys.

United States Patent Office 2,779,633
Patented Jan. 29, 1957

2,779,633

WHEEL COVER

George Albert Lyon, Detroit, Mich.

Application September 3, 1954, Serial No. 454,002

8 Claims. (Cl. 301—37)

The present invention relates to improvements in wheel structures and more particularly concerns the ornamental and protective covering of the outer sides of vehicle wheels.

An important object of the present invention is to provide a wheel structure with improved means for covering the outer side thereof.

Another object of the invention is to provide a novel trim ring and hub cap combination for the outer side of a vehicle wheel.

A further object of the invention is to provide an improved trim ring assembly for vehicle wheels wherein the trim ring is held on the wheel by a hub cap free from any tensions or strains in service tending to disengage the cover assembly unintentionally.

Still another object of the invention is to provide an improved trim ring assembly for vehicle wheels providing for air circulation through the wheel and through and past the trim ring.

Other objects, features and advantages of the present invention will be readily apparent from the following detailed description of certain preferred embodiments thereof taken in conjunction with the accompanying drawing, in which:

Figure 1 is a side elevational view of a wheel structure embodying features of the invention;

Figure 2 is a fragmentary, enlarged radial sectional view taken substantially on the line II—II of Figure 1;

Figure 3 is a radial sectional view similar to Figure 2 but showing a modification; and Figure 4 is a fragmentary outer side elevational view of the trim ring of Figure 3.

Having reference to Figures 1 and 2, the invention is shown in association with a wheel including a wheel body 5 having at its outer margin a generally axially inwardly directed attachment flange 7 secured in suitable fashion to a base flange 8 of a tire rim. At suitable intervals such as three or four inset areas in the flange 7 provide wheel openings 9 through the wheel through which air may circulate. From the base flange 8 extends a side flange 9 merging with an intermediate flange 10 at the axially outer portion which is a terminal flange 11 of the tire rim. The construction and arrangement of the tire rim is of the multi-flange, drop-center type adapted to support a pneumatic tire and tube assembly 12.

In the present instance the wheel body 5 is preferably constructed along the lines covered in my issued Patent 2,445,330 dated July 20, 1948, and adapted to support thereon a hub cap 13. For this purpose the wheel body 5 is provided with a generally axially outwardly bulged portion 14 having at the radially outer side thereof and spaced radially inwardly from the wheel openings 9, a generally radially outwardly facing shoulder 15 provided at suitable spaced intervals such as three or four, with cover-retaining generally radially outwardly projecting bumps 17 provided with axially and radially inwardly sloping respective cover-retaining shoulders 18 spaced throughout in offset relation to the shoulder 15 on the wheel body so as to make efficient retaining interengagement with a turned resiliently flexible marginal bead 19 on the hub cap. Thus, the hub cap 13 can be pressed into position on the wheel over the retaining bumps 17 and the beaded edge 19 of the hub cap can be pried free from the bumps with a pry-off tool when desired.

According to the present invention a trim ring 20 is provided for substantially covering the tire rim and the portion of the wheel body located radially outwardly from the edge of the hub cap on the wheel. The trim ring comprises an annular body made from suitable material such as sheet metal such as stainless steel or brass suitably finished as, for example, by polishing and plating. The trim ring body extends generally radially and axially outwardly from an inner marginal extremity 21 of a diameter to snap behind the retaining bumps 18 in a manner to retain the trim ring on the wheel in a preliminary fashion at least, and more particularly when the hub cap 13 is removed, or before the hub cap has been applied to the wheel. In this manner, when the hub cap 13 is applied to the wheel and the retaining bead 19 thereof contractionally grips the retaining bump shoulders 18 and is cammed axially inwardly toward the cover body 5, the bead will press firmly against the trim ring inner marginal extremity 21 and thereby clamp the same firmly against the wheel body against any possibility of the trim ring rattling on the wheel.

Since in service a vehicle wheel such as that here involved flexes and weaves to some extent, especially when the vehicle is run around a corner or in a turn, it is desirable to have the trim ring free from engagement with one of the wheel members while the trim ring is held in position on the other of the wheel members. In the present instance, of course, the trim ring is held on the wheel body 5. Therefore, it is desirable to maintain the trim ring out of engagement in the assembly with respect to the tire rim. This is accomplished as best seen in Fig. 2 by having the body of the trim ring 20 extend to a substantially axially outward overlying relation to the tire rim and more particularly the terminal flange 11 thereof. In this instance the trim ring is provided with a generally radially outwardly and axially inwardly sloping annular marginal portion 22 that overlies the terminal flange 11 in spaced relation and joins the body of the trim ring on a reinforcing and stiffening rib juncture 23. Through this arrangement a substantial gap is provided between the outer margin of the trim ring and the tire rim through which air is adapted to circulate in the operation of the wheel, and thereby facilitate circulation of air through the wheel openings 9. At its outer extremity the marginal portion 22 of the trim ring is preferably provided with an underturned reinforcing and finishing flange 24 which is preferably spaced from the tip of the terminal flange 11 to enable free air passage thereby and also to accommodate wheel balancing weights that may be applied to the terminal flange behind the trim ring outer margin.

Additional facility for air circulation is afforded by providing the body of the trim ring 20 with a plurality of air circulation apertures 25 in the present instance comprising generally radially elongated slots disposed in a spaced circumferential series. These air circulation openings 25 are disposed in assembly opposite the wheel openings 9.

When the trim ring 20 is on the wheel, a valve stem 27 projects through a suitable valve stem aperture 28 therein. It is desirable to prevent distortion of the valve stem as might occur should the trim ring 20 be permitted to turn on the wheel. Such turning of the trim ring is avoided herein by the provision of means on the trim ring radially outwardly adjacent to the inner marginal portion 21, that is, spaced radially outwardly from the inner edge of the trim ring, for engagement with the wheel body. Herein, such means comprise axially inwardly turned flanges 29 pressed out of the material of the trim ring in the formation of the openings 25 and having axially inner end portions 30 which are pressed firmly against the wheel body 5 by the axially inward thrusting force of the hub cap bead 19 acting against the inner marginal extremity portion 21 of the trim ring. Since the edges defining the flanges 29 and more particularly at the radially inner ends of the flanges are fairly rough as a result of the pressing out thereof from the body of the trim ring, the burred edges engaging the wheel body will bite or tend to dig thereinto, and more particularly the paint covering the wheel body and strongly resist any tendency for the trim ring to turn in either direction on the wheel responsive to torque forces exerted thereagainst, as when the wheel is rapidly accelerated or rapidly decelerated.

In the modification of Figures 3 and 4, structural details of the tire rim and wheel body are substantially the same as shown in Figure 2 and therefore the same reference numerals have been applied to identical parts. However, in this form a hub cap 31 is applied to the outer side of the wheel and retains in service position a trim ring 32. It will be observed that the hub cap 31 has an outer marginal structure provided with a resiliently flexible marginal inturned bead 33 cooperating with the retaining bumps 17 to retain the hub cap on the wheel.

The trim ring 32 has an inner marginal extremity portion 34 in assembly cooperating with the bumps 17 for preliminarily retaining the trim ring on the wheel and when the hub cap 31 is on the wheel being engaged by the retaining bead 33 of the hub cap and pressed firmly toward the wheel body 5.

The body of the trim ring 32 extends generally radially and axially outwardly into overlying relation to the axially outer side of the tire rim and is provided with an angular stepped reinforced outer marginal portion 35 having an underturned extremity reinforcing and finishing flange 37 of bead-like nature spaced in axially outward relation from the tire rim terminal flange 11 whereby air circulation past the outer perimeter of the trim ring is enabled.

In the body portion of the trim ring 32 a series of circumferentially spaced air circulation apertures 38 is provided, in the present instance of generally wedge shape wider at the radially outer ends than at the radially inner ends, and the radially inner ends are disposed closely adjacent to the inner marginal portion 34 of the trim ring. Along the longitudinal sides of the openings 38 are provided respective generally axially inwardly directed flanges 39 derived from the material of the trim ring body in striking out the openings 38. At their radially inner ends the flanges 39 engage against the wheel body 5 under the axially inward thrust imposed by the hub cap bead 33 in the assembly. Thereby the trim ring 32 is held against turning in either direction on the wheel in service since the inner ends of the flanges 39 act as spurs or anchoring points biting or digging into the surface of the wheel body 5.

It will be observed that by the radially elongated formation of the openings 25 and 33 in the trim ring, the areas between the openings afford a generally spoke-like appearance to the cover. In addition, the flanges 29 and 39, respectively, of the trim rings by extending throughout the lengths of the openings with which associated afford substantial rigidifying braces for the spoke portions between the openings and thereby maintain the trim ring body substantially rigid radially outwardly from the respective inner marginal bump-engaging and hub cap engaged marginal extremities 21 and 34, respectively of the trim rings.

It will be understood that modifications and variations may be effected without departing from the scope of the novel concepts of the present invention.

I claim as my invention:

1. In a wheel structure including a wheel body and a tire rim, a hub cap for disposition at the outer side of the wheel body and engageable with retaining means on the wheel body, and a trim ring having an inner marginal portion retainingly underlying the hub cap, said trim ring having adjacent the portion thereof engaged by the hub cap generally axially inwardly directed turn-preventing means spaced radially outwardly from the inner edge of the trim ring and arranged to thrust against the wheel body under retaining pressure against the inner marginal portion of the trim ring by the hub cap.

2. In a wheel structure including a wheel body and a tire rim, a hub cap for disposition at the outer side of the wheel body and engageable with retaining means on the wheel body, and a trim ring having an inner marginal portion retainingly underlying the hub cap, said trim ring having adjacent the portion thereof engaged by the hub cap generally axially inwardly directed turn-preventing means arranged to thrust against the wheel body under retaining pressure against the inner marginal portion of the trim ring by the hub cap, said turn-preventing means comprising flanges struck out from the body of the trim ring radially outwardly relative to the inner edge of the trim ring.

3. In a wheel structure including a wheel body and a tire rim, a hub cap for disposition at the outer side of the wheel body and engageable with retaining means on the wheel body, and a trim ring having an inner marginal portion retainingly underlying the hub cap, said trim ring having adjacent the portion thereof engaged by the hub cap generally axially inwardly directed turn-preventing means arranged to thrust against the wheel body under retaining pressure against the inner marginal portion of the trim ring by the hub cap, said turn-preventing means comprising flanges defining openings through the trim ring spaced radially outwardly beyond the edge of the hub cap.

4. In a wheel structure including a tire rim and a wheel body, a hub cap for disposition at the outer side of the wheel body and engageable retainingly with retaining means on the wheel body, a trim ring having an inner marginal portion engaging the wheel body and retained in place by the hub cap, said trim ring extending into substantially overlying relation to the tire rim and being entirely spaced therefrom and providing an air gap between the tire rim and the outer margin of the trim ring, there being an aperture in the trim ring for access projection therethrough of a valve stem extending from the tire rim, and means on the trim ring radially outwardly adjacent to said marginal portion engageable with the wheel body to hold the trim ring against turning on the wheel.

5. In a wheel structure including a tire rim and a wheel body, a hub cap for disposition at the outer side of the wheel body and engageable retainingly with retaining means on the wheel body, a trim ring having an inner marginal portion engaging the wheel body and retained in place by the hub cap, said trim ring extending into substantially overlying relation to the tire rim and being entirely spaced therefrom and providing an air gap between the tire rim and the outer margin of the trim ring, the body of the trim ring having apertures therein for air circulation therethrough and said apertures having flanges directed generally axially inwardly and pressing under thrust from the hub cap against the wheel body to hold the trim ring against turning on the wheel.

6. In a wheel structure including a tire rim and a wheel body, a hub cap for disposition at the outer side of the wheel body, a trim ring having a plurality of generally spoke-like portions separated by elongated apertures in the trim ring and provided with an annular inner extremity flange engageable by the hub cap to thrust the same into retained relation with the wheel body, and generally axially inwardly directed biting means at the inner ends of the apertures engageable with the wheel body under hub cap imposed thrust to retain the trim ring against turning.

7. In a wheel structure including a wheel body and a tire rim, the wheel body having generally radially outwardly directed cover-retaining bumps thereon, a hub cap for disposition at the outer side of the wheel and provided with a marginal portion retainingly engageable with the bumps, a trim ring for substantially covering the tire rim and the portion of the wheel body radially outwardly from said bumps, said trim ring having an inner marginal portion for underlying the retaining margin of the hub cap and pressed thereby toward engagement with the wheel body, and generally axially inwardly directed flanges on a radially outer part of said marginal portion of the trim ring engaging under pressure of the hub cap against the wheel body and thereby holding the trim ring against turning on the wheel.

8. In a wheel structure including a tire rim and a wheel body with openings through the wheel adjacent juncture of the tire rim and wheel body and with a generally radially outwardly facing annular shoulder on the wheel body radially inwardly from the openings and provided with radially outwardly projecting cover retaining bumps, a hub cap for engagement in snap-on pry-off relation with the bumps, and a trim ring for overlying the wheel body between said shoulder and extending into overlying relation to the tire rim with an opening in the trim ring for access registration and projection therethrough of a valve stem extending from the tire rim, said trim ring having an inner marginal portion underlying the edge of the hub cap and thereby held in place on the wheel, the trim ring extending generally radially and axially outwardly and lying entirely spaced from the tire rim to afford a substantial air gap between the trim ring and the tire rim for passage of air between the wheel openings and said gap, the trim ring having radially extending intermediate reenforcement and having annular outer marginal reenforcing structure for substantially stiffening the same so that the trim ring will be self-sustaining and rigid enough to withstand normal service conditions although supported entirely at its inner margin between the edge of the hub cap and the wheel body, there being means on the trim ring radially outwardly adjacent to said inner marginal portion for engagement with the wheel body to retain the trim ring against turning on the wheel.

References Cited in the file of this patent
UNITED STATES PATENTS

| | | |
|---|---|---|
| Re. 19,467 | Lyon | Feb. 12, 1935 |
| 2,094,326 | Lyon | Sept. 28, 1937 |
| 2,544,702 | Lyon | Mar. 13, 1951 |
| 2,544,703 | Lyon | Mar. 13, 1951 |
| 2,569,483 | Lyon | Oct. 2, 1951 |